Jan. 26, 1971    J. PERTHEN ET AL    3,557,613
METHOD OF AND APPARATUS FOR GENERATING ELECTRICAL VOLTAGE
CORRESPONDING TO A CONTOUR PROFILE CURVE OF A SURFACE
TO BE TESTED FOR ROUGHNESS
Filed March 29, 1968    3 Sheets-Sheet 1

$U_{3V}$ - - - -
$U_{3R}$ ———

United States Patent Office 3,557,613
Patented Jan. 26, 1971

3,557,613
METHOD OF AND APPARATUS FOR GENERATING ELECTRICAL VOLTAGE CORRESPONDING TO A CONTOUR PROFILE CURVE OF A SURFACE TO BE TESTED FOR ROUGHNESS
Johannes Perthen, 21/23 Wohlenbergstrasse 3, Hannover 1, Germany, and Friedrich Hildebrandt, Langenhagen, and Werner Gerighausen, Ronnenberg, Germany; said Hildebrandt and Gerighausen assignors to said Perthen
Filed Mar. 29, 1968, Ser. No. 717,284
Claims priority, application Germany, Oct. 27, 1967, P 43,270
Int. Cl. G01b 5/28
U.S. Cl. 73—105   11 Claims

ABSTRACT OF THE DISCLOSURE

Method of and apparatus for generating a voltage curve that corresponds to the contour profile of a surface. The contour profile is a curve that consists of a series of upwardly convex, interconnected arcs. A stylus traces the surface in a first direction, then retraces the surface in a second, opposed direction. By means of a transducer and an RC circuit two voltage curves are consecutively generated which comprise arcuately declining portions. The two voltage curves are simultaneously applied to a comparator at the output of which there appears the larger one of the two compared values. The series of voltage values supplied by the comparator constitutes a voltage curve that corresponds to the said contour profile.

FIELD OF THE INVENTION AND DESCRIPTION OF THE PRIOR ART

The invention relates to apparatus of the type that generate an electrical voltage as a function of surface irregularities. This voltage is then used as a reference potential for the automatic determination of the so-called smoothing depth and other surface data.

Devices for the aforenoted purpose generally comprise a tracer system including a stylus guided on the surface to be tested and an electromechanical transducer. The tracer system may operate either according to the generator principle or according to the system of carrier frequency modulation. The electric output of the transduced is fed into a waviness filter for separating the components of waviness and roughness of the measured electric data.

For the electrical determination of the smoothing depth and other data of a surface, the methods and apparatus known heretofore have used as an electric reference potential (from which the mean values are developed) a saw-tooth curve extending about the center line of gravity of the surface profile. This profile consists in general of a series of alternating irregular peaks and valleys. The saw-tooth curve is generated by an alternately charged and discharged RC component. This component is charged with a usually amplified pulsating voltage which corresponds to the surface irregularities and which is delivered by the tracer system. Such a saw-tooth curve, which is the result of the charging and discharging of a capacitor according to an $e$-function, is not derived from a theoretically correct reference profile and, consequently, the surface data, (for example, the smoothing depth) obtained by means of the afore-outlined known process, deviate in part quite substantially from the theoretically correct values.

SUMMARY AND OBJECT OF THE INVENTION

The voltage generated by the apparatus and according to the method of the invention is derived from a theoretically correct reference profile formed of a series of upwardly convex (downwardly open) connected arcs of various lengths fitted on the surface to be tested. This profile will be referred to hereinafter as the "contour profile" curve.

It is an object of the invention to provide a novel method and apparatus to generate an electric voltage derived from and corresponding to a contour profile curve of a surface.

Briefly stated, according to the invention, a tracer system consecutively scans the surface to be tested in two opposite directions and, after separating the waviness, the electric output corresponding to the actual profile is applied through a diode to a capacitor for charging the latter to those profile voltage peaks which are higher than the then-prevailing capacitor voltage. The voltage drop during the discharges of the capacitor describes a voltage curve comprising a series of upward convex portions. The voltage curve is, during the forward motion of the tracer system, stored, e.g. on a magnetic tape, and the stored voltage curve is, together with the voltage curve generated during the backward motion of the tracer system, applied to a comparator circuit which transmits in each instant only the larger one of the two voltage values. As a result, at the output of the comparator circuit there appears a voltage which corresponds to the complete contour profile.

From the contour profile as a reference profile obtained by means of an electrical voltage as outlined above, the desired surface values (such as smoothing depth, mean rough values, carrying component, groove depth, etc.) may be automatically derived with a high degree of accuracy.

The invention will be better understood and further objects and advantages will become more apparent from the ensuing detailed specification of several exemplary embodiments taken in conjunction with the drawings.

DEFINITION OF THE CONTOUR PROFILE CURVE

Since the voltage obtained by means of the novel method and apparatus is derived from and correspond to the contour profile curve fitted over the actual profile of the surface to be tested, the nature and theoretical construction of the contour profile curve will first be briefly discussed.

Figure 1:
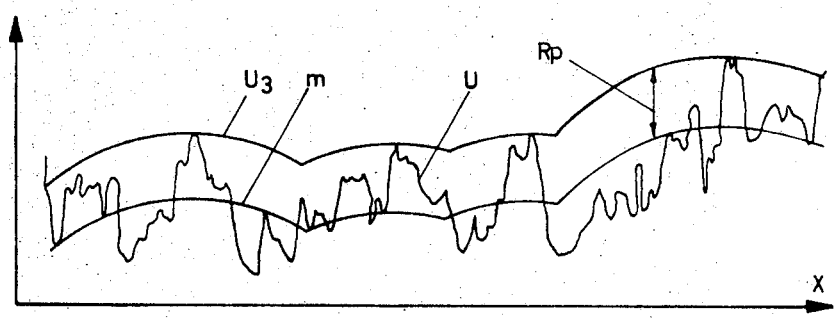
FIG. 1 is a diagram showing an actual profile curve U of a surface and a contour profile curve $U_3$.

Turning now to the diagram shown in FIG. 1, for determining the contour profile according to the so-called $e$-system, it is assumed that a ball of predetermined radius rolls over a measured distance $x$ on the actual surface profile U along a straight line. The center of this ball describes, during such a movement, a trajectory which consists of a series of circular arcs open towards the surface. This trajectory is then lowered onto the surface profile by a distance identical to the radius of the ball so that the trajectory now contacts the salient peaks over which the ball has rolled. This curve, which thus contacts the actual surface profile, is called "contour profile" and is designated in FIG. 1 with the reference character $U_3$.

Between the contour profile $U_3$ and the actual profile U there is a space extending in the valley portions between the peaks. If this space under the contour profile is leveled, i.e. equally divided into an upper space portion and a lower space portion, for example, by planimetering, there is obtained an average profile curve $m$ which has a shape identical to the contour profile $U_3$. The curve $m$ extends below the contour profile $U_3$ at a distance $R_p$ (the so-called smoothing depth) therefrom and divides the space therebelow lengthwise along the measured distance $x$.

DESCRIPTION OF THE PREFERRED EMBODIMENT FOR GENERATING A VOLTAGE CURVE CORRESPONDING TO A CONTOUR PROFILE

Figure 2:
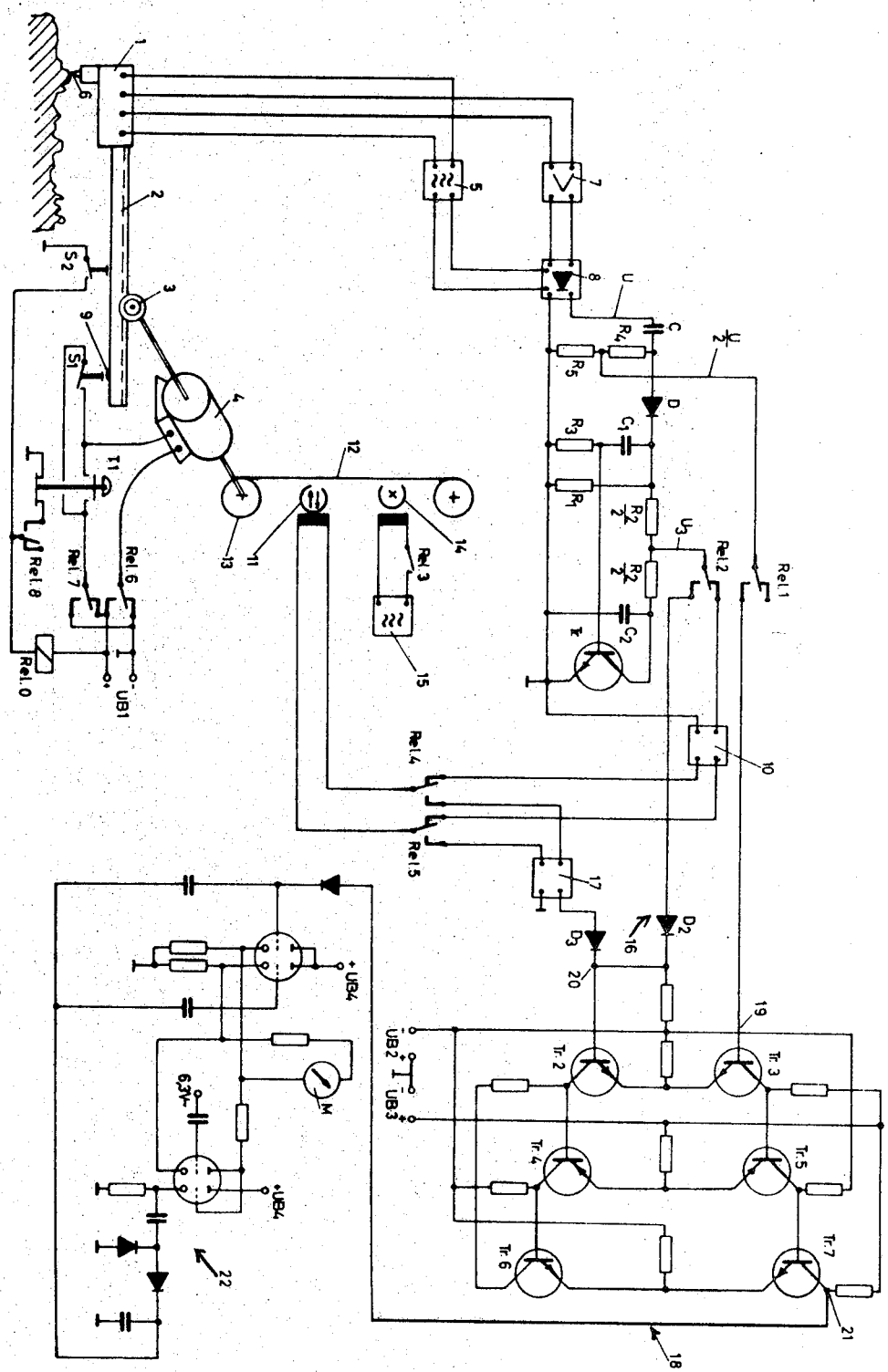
FIG. 2 is a circuit diagram of one embodiment of the invention.

Turning now to FIG. 2, the circuit shown therein includes a capacitor $C_1$ which is chargeable across a diode D and a resistance $R_3$. With the serially coupled capacitor $C_1$ and resistance $R_3$ there is connected in parallel a discharge resistance $R_1$ on the one hand and a resistance $R_2$ (provided with a center tap) in series with a further capacitor $C_2$ on the other hand.

It may be shown mathematically that the capacitor $C_1$ charged to a determined voltage $U_0$ will discharge across the aforenoted components according to a function $U_3$ which, with an appropriate choice of the components will have the shape of a downwardly open circular arc.

The aforedescribed circuit nucleus (capacitors $C_1$ and $C_2$, resistances $R_1$ and $R_2$) produces, at the center tap of resistance $R_2$, voltages from which—as will be seen from the ensuing detailed description—a voltage curve corresponding to the contour profile is composed.

The tracer system 1 is guided over a surface to be tested by means of a motor 4 and a rack and pinion assembly 2, 3. Simultaneously, the motor 4 also drives a magnetic tape 12 through gear means 13.

It is assumed that the tracer system is formed of an inductive bridge (not shown) supplied by a carrier frequency generator 5. The diagonal bridge voltages proportionate to the excursions of the stylus 6 from its position of rest are amplified by means of amplifier 7 and rectified in phase by means of a demodulator 8 also supplied by the generator 5. It will be understood that instead of this or similar modulating tracer systems, other generator tracer systems may be used without departing from the scope of the invention.

The output voltage of demodulator 8 is designated with U, while its peak value is given the reference character $U_0$. Further, the voltages delivered by the demodulator 8 during the forward and subsequent backward movement of the tracer system 1 are designated respectively as $U_V$ and $U_R$; while the corresponding peak values are given respective reference characters $U_{0V}$ and $U_{0R}$.

The voltage U, corresponding to the actual profile of the surface, is first fed into a waviness filter comprising capacitor C and resistances $R_4$ and $R_5$ so that the voltage output of the waviness filter applied to capacitor $C_1$ across diode D contains only the roughness component (and thus no longer the waviness component) of the electrical values supplied by the tracer system 1.

The capacitor $C_1$ is charged to a corresponding peak voltage value $U_0$ each time the stylus 6 climbs upwardly towards a surface profile peak. When the voltage U delivered by demodulator 8 during the subsequent downhill motion of the stylus 6 from the given surface peak drops below the value of $U_0$, the charge stored in capacitor $C_1$ is prevented by the diode D from flowing back into the demodulator 8.

The capacitor $C_1$ discharges as a function of time across the resistance $R_1$ and as a result, the aforenoted arcuately dropping voltage appears at the center tap of the resistance $R_2$.

If now the voltage U again increases as the stylus 6 climbs towards a new surface peak, the capacitor $C_1$ is charged to the next peak value.

In order to ensure that the capacitor $C_2$ is completely discharged at the beginning of each discharge of capacitor $C_1$, to capacitor $C_2$ there is connected in parallel the emitter-collector branch of a transistor $Tr$, the base of which is coupled to the joint between the capacitor $C_1$ and the resistance $R_3$. As long as a charging current flows across the resistance $R_3$, the transistor $Tr$ is conductive so that the capacitor $C_2$ is completely discharged. On the other hand, at the beginning of discharge of the capacitor $C_1$, the transistor $Tr$ blocks and thus permits the build-up of the aforenoted voltage $U_3$ at the center tap of resistance $R_2$.

Figure 3:
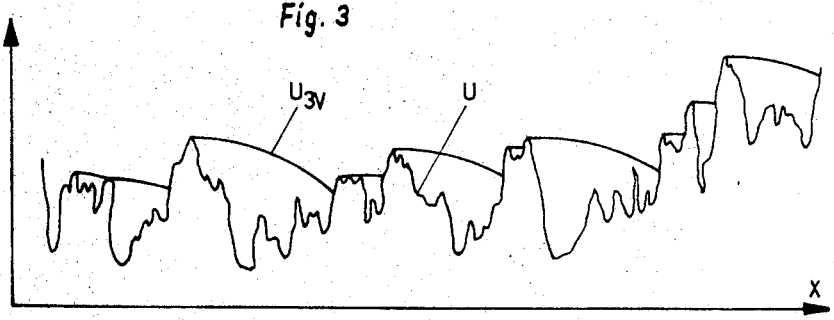
FIG. 3 is a diagram relating to voltages generated during the forward motion of the tracer stylus on the surface to be tested.
Figure 5:
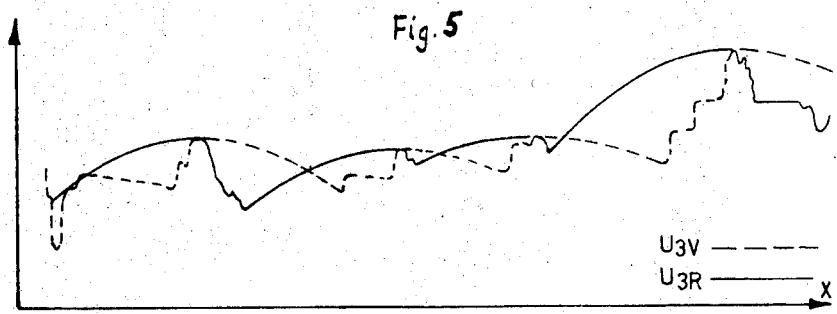
FIG. 5 is a diagram showing the superposition of the two voltage curves generated during the forward and subsequent backward motion of the tracer stylus on the surface to be tested.

Turning now to FIG. 3 there is shown the course of voltage $U_{3V}$ appearing at the center tap of resistance $R_2$ during the forward motion of the tracer system 1 over the surface to be tested. This voltage curve consists (a) of rightward dropping and downwardly open connecting arcs extending from the salient peaks of the actual profile U to cut-off points on the left, ascending flanks of the actual profile peaks and (b) of portions corresponding to those parts of the actual profile U that extend from said cut-off points up to the profile peaks. The rightward progressing voltage curve $U_{3V}$ is shown in broken lines in FIG. 5.

Figure 4:
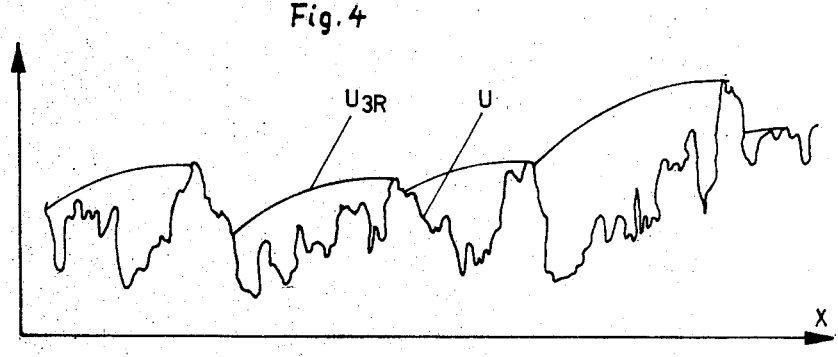
FIG. 4 is a diagram relating to voltages generated during the backward motion of the tracer stylus on the surface to be tested.

Similarly, as seen in FIG. 4, the voltage curve $U_{3R}$ generated during the backward motion of the tracer system 1 over the same path $x$, is composed (a) of leftward dropping and downwardly open connecting arcs extending from the salient peaks of the actual profile U to cut-off points on the right, ascending flanks of the actual profile peaks and (b) of portions corresponding to those parts of the actual profile U that extend from these last named cut-off points up to the profile peaks. The leftward progressing voltage curve $U_{3R}$ is shown in solid lines in FIG. 5. Thus, the voltage $U_{3R}$ is obtained at the center tap of resistance $R_2$ during the backward motion of the tracer system 1.

The complete contour profile is composed from the two voltage curves $U_{3V}$ and $U_{3R}$ in the following manner:

During the forward motion of the tracer system 1 over the surface to be tested, the voltage $U_{3V}$ taken from the center tap of resistance $R_2$ is fed into a magnetic head 11 through a relay contact R$el$2, a recording transducer 10 and a relay contact R$el$4 and is stored on the magnetic tape 12. The tape 12 is demagnetized prior to the recording or storing process by many of an erasing head 14 which is coupled to a generator 15 across a relay contact R$el$3.

During the backward motion of the tracer system 1 the relay contact R$el$2 is switched over so that the voltage $U_{3R}$ taken from the center tap of resistance $R_2$ is applied to one input terminal (diode $D_2$) of a comparator circuit 16. The other input terminal (diode $D_3$) of comparator circuit 16 is connected, during the backward motion of the tracer system, through a reproducing transducer 17 and a relay contact R$el$5 with the magnetic head 11 which retrieves the voltage $U_{3V}$ precedingly stored on the magnetic tape 12.

Of diodes $D_2$ and $D_3$ of the comparator circuit 16 only that one is conductive at any given moment to which the higher momentary voltage is applied. Thus, the comparator circuit 16 transmits only that component of the simultaneously applied voltages $U_{3V}$ and $U_{3R}$ which pertains to an arc of the contour profile $U_3$ (FIGS. 1, 3 and 4). This result is also reflected in FIG. 5 where it may be observed that at any moment the arcuate discharged voltages are higher than the fluctuating charging voltages. Thus, the voltage $U_3$ appearing at the output 20 of the comparator circuit 16 corresponds to the contour profile of the surface to be tested.

Turning once again to FIG. 2, the actuation of the individual relay contacts during the measuring process is carried out in the following manner:

Before beginning the measuring process the relay R$el$0 is unenergized. The relay contacts R$el$1 through R$el$8 are in a position as shown in FIG. 2. The switch $S_1$ is held open by means of a cam or dog 9 carried by rack 2. The switch $S_2$ is also open.

The measuring process is initiated by a momentary depression of the button $T_1$ whereby the motor 4 receives current from a DC source UB1 across relays R$el$6 and 7 as well as the upper contacts of the button $T_1$. Shortly after the tracer system 1 is set into motion, the dog 9 clears the switch 1 permitting it to close so the circuit of motor 4 remains closed even when the button $T_1$ is released. The voltage $U_{3V}$ taken from the center tap of resistance $R_2$ during the forward motion of the tracer system is stored on the magnetic tape 12 as set forth hereinbefore.

After the tracer system 1 covers the predetermined measuring distance, the circuit of the relay R$el$0 is closed by closing the switch $S_2$ by means of the dog 9. Thereby all relay contacts R$el$1 through R$el$8 switch to their alternate position. Thus, during the backward motion of tracer system 1, the relays R$el$1 and R$el$3 maintain their respective circuits open; relays R$el$2, R$el$4 and R$el$5 transmit voltage $U_{3V}$ to recording head 11 for storage on magnetic tape 12 and relays R$el$6, R$el$7 cause the motor 4 to rotate in the forward direction. On the other hand, when the relays are reversed for the backward motion of tracer system 1, relay R$el$1 transmits a voltage corresponding to the actual profile to a differential amplifier 18 to be described hereinafter; R$el$2 transmits voltage $U_{3R}$ to diode $D_2$ of comparator circuit 16; relays R$el$4 and R$el$5 transmit the retrieved voltage $U_{3V}$ to diode $D_3$ of comparator circuit 16; relays R$el$6 and R$el$7 cause the motor 4 to rotate backward and relay R$el$3 closes the circuit of generator 15 to erase voltage $U_{3V}$ after being retrieved by head 11. The motor 4 now guides the tracer system 1 back towards its initial position. When the tracer system 1 reaches this initial position, the dog 9 opens the switch $S_1$ causing the motor 4 to stop.

DESCRIPTION OF ANOTHER EMBODIMENT FOR GENERATING ARCUATELY DROPPING PORTIONS OF A VOLTAGE CURVE CORRESPONDING TO A CONTOUR PROFILE

It is known that in the surface measuring technique, the actual profile is often illustrated in a greatly enlarged manner. In such a case, the circular arcs (which, as it was set forth before, form the basis for the construction of the contour profile according to the $e$-system) are distorted into ellipses. Although it is possible to replace these ellipses in an approximative manner by their circles representing the peak curvatures and using this substitution as a starting point to determine the contour profile of an actual profile represented in a greatly enlarged manner, such a solution, however, incorporates a certain degree of error.

Figure 6:
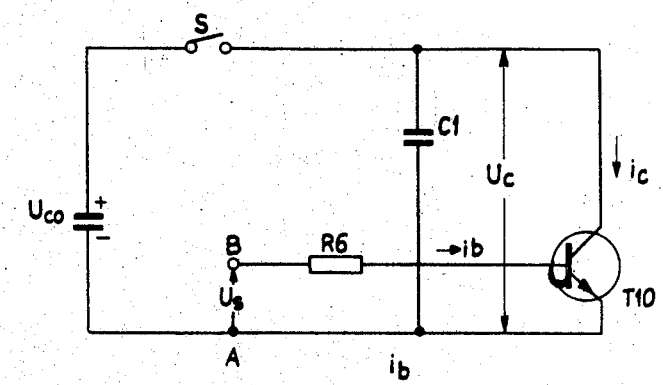
FIG. 6 is a partial, theoretical circuit diagram of another embodiment of the invention.
Figure 7:
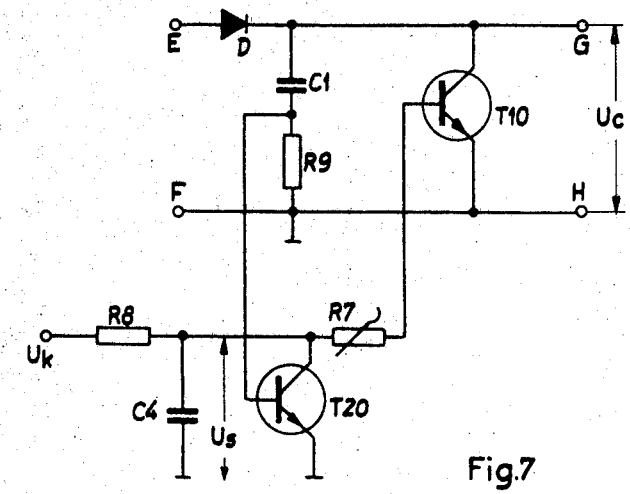
FIG. 7 is a partial, practical circuit diagram of the embodiment of FIG. 6.

The embodiment shown in FIGS. 6 and 7 permits, in case of a greatly enlarged representation of the actual profile, the generation of an electrical contour profile voltage which approximates with a high degree of accuracy, the theoretical contour profile curve composed of individual elliptical arcs.

The basic circuit diagram according to FIG. 6 comprises a first capacitor $C_1$ which is identical to capacitor $C_1$ of FIG. 2. This capacitor may be charged to a positive voltage $U_{c0}$ through a switch S. With capacitor $C_1$ there is coupled in parallel the emitter-collector branch of a first transistor $T_{10}$, the base of which is connected to a control voltage source (terminals A, B) across a first resistance $R_6$.

It is assumed that the capacitor $C_1$ is charged to voltage $U_{c0}$ in a closed position of switch S. If thereafter the switch S is opened, the capacitor $C_1$ cannot discharge as long as the transistor $T_{10}$ is blocked. If now to terminals A, B a control voltage $U_s$ is applied which increases linearly from a zero value, the transistor $T_{10}$ will become progressively conductive by virtue of the base current $i_b$, allowing the flow of an increasing discharge current $i_c$.

It can be shown mathematically that, if the control voltage $U_s$ increases proportionate to time, the voltage $U_c$ decreases in a parabolic manner.

By appropriate choice of the circuit components, this parabola may be fitted over any desired ellipse.

FIG. 7 shows a practical embodiment of the basic circuit shown in FIG. 6. In addition to the circuit components $T_{10}$, $C_1$ and $R_6$ already present in the circuit diagram shown in FIG. 6, there are provided a further transistor $T_{20}$, a further capacitor $C_4$, as well as two further resistances $R_7$ and $R_8$. The switch designated at S in FIG. 6 is a diode D.

The electric voltage corresponding to the actual profile is applied to terminals E and F at which time it charges the capacitor $C_1$ across the diode D to the voltage values corresponding to the profile peaks. As long as a charging current is flowing and, accordingly, a potential exists at the joint between the capacitor $C_1$ and the resistance $R_9$, the transistor $T_{20}$ is conductive and, accordingly, the transistor $T_{10}$ is blocked.

When, after charging the capacitor $C_1$ to a peak value, the charge circuit is without current, the transistor $T_{20}$ is blocked. As a result, the control voltage $U_s$ builds up in a linearly increasing manner on the capacitor $C_4$ (which was discharged precedingly through the conductive transistor $T_{20}$). The capacitor $C_4$ is, for this purpose, connected to a relatively high DC voltage $U_k$, so that only the first, relatively linear portion of the charge voltage characteristics is used. The linearly increasing control voltage $U_s$ effectuates, in a manner set forth in connection with FIG. 6, the increasing conductivity of the transistor $T_{10}$. Consequently, at the output terminals G, H a voltage $U_c$ appears which drops parabolically from the peak voltage value of the capacitor $C_1$.

BRIEF DESCRIPTION OF DEVICES FOR OBTAINING SURFACE DATA FROM THE REFERENCE VOLTAGE CURVE GENERATED IN ACCORDANCE WITH THE INVENTION

In order to obtain the different surface data by using the contour profile as the reference potential, the difference between the voltages proportionate to the actual profile and to the contour profile has to be formed.

For this purpose a voltage $U/2$ proportionate to the actual profile is taken from between the resistances $R_4$ and $R_5$ (FIG. 2) and is applied, during the backward motion of tracer system 1, through a relay contact R$el$1 to the input terminal 19 of a differential amplifier 18. The other input terminal of the differential amplifier 18 is coupled to the output terminal 20 of the comparator circuit 16.

The difference between the voltages corresponding to the contour profile on the one hand, and to the actual profile on the other hand, is formed and amplified in the differential amplifier 18 of known construction. In order to obtain herefrom the smoothing depth $R_p$ (FIG. 1), an integrator 22 is connected to the output 21 of the differential amplifier 18. The indicator M of the integrator 22 is calibrated for the values of "smoothing depth $R_p$," taking into account the length of the measured distance on the surface to be tested.

If the voltage appearing at the output 21 of the differential amplifier 18 is fed into a peak voltage measuring instrument (not shown), the surface measurement of the "peak-to-valley depth $R_t$" is obtained.

Using the contour profile curve obtained by the novel process, it is further possible to exactly determine the arithmetic center line or average height $R_a$ and the geometrical root mean square average height $R_s$. For this purpose two tracer operations in both directions are required.

During the first forward motion of the tracer system, the $U_{3V}$ values are stored on a first track of the magnetic tape 12. During the first backward motion of the tracer system, the $U_3$ values are stored on a second track of the magnetic tape, the difference between the U values of the actual profile and the $U_3$ values of the contour profile is formed and stored in the integrator 22 as an $R_p$ value.

During the second tracing operation of the surface along the reference length, simultaneously both tracks of the magnetic tape 12 are retrieved, the $U_{3V}$ and $U_{3R}$ values that belong together are added and are reduced by a voltage corresponding to the smoothing depth $R_p$. Thereby the standard reference curve (the means profile $m$ shown in FIG. 1) for the integrating steps for the determination of the $R_a$ and $R_s$ values is obtained.

Although several embodiments of the invention have been depicted and described, it will be apparent that these embodiments are illustrative in nature and that a number of modifications in the apparatus and variations in its end use may be effected without departing from the spirit or scope of the invention as defined in the appended claims.

What is claimed is:

1. A method of generating voltage values corresponding to a contour profile curve theoretically fitted over an actual profile of a surface to be tested for roughness, said method comprising the following steps:
   (A) scanning said surface in a forward and subsequently in a backward direction along a predetermined path by means of a tracer system to obtain actual profile voltages forming actual profile voltage curves having salient peaks,
   (B) applying said actual profile voltages to circuit means to obtain at the output thereof voltage values forming curves comprising a series of upwardly convex, arcuately declining portions, the highest or starting point of each said portion coincides with one of said salient peaks, and the lowest or terminal point of each said portion is located on an adjacent ascending flank of said actual profile voltage curves,
   (C) storing said voltage values obtained in step (B) during said forward scanning, and
   (D) introducing said stored voltage values obtained during said forward scanning and said voltage values obtained at the output of said circuit means during said backward scanning simultaneously into a comparator circuit to obtain at the output thereof at each instant the larger one of the compared voltage values, the series of said larger voltage values appearing at the output of said comparator circuit corresponding to said contour profile curve.

2. A method as defined in claim 1, wherein said step (B) includes applying said actual profile voltages across a diode to a capacitor for periodically charging the latter to those peaks of the actual profile voltages which are higher than the then-prevailing voltage on said capacitor, and periodically discharging said capacitor to obtain said series of upwardly convex, arcuately declining portions.

3. A method as defined in claim 1, wherein said step (C) includes storing on a magnetic tape.

4. An apparatus for generating voltage values corresponding to a contour profile curve theoretically fitted over an actual profile of a surface to be tested for roughness comprising,
   (A) means for supplying actual profile voltages corresponding to irregularities of a surface to be tested, said voltages forming actual profile voltage curves having salient peaks, said means including
      a tracer system adapted to be guided upon said surface,
   (B) circuit means for converting said actual profile voltages into voltage values forming curves comprising a series of upwardly convex, arcuately declining portions, the highest or starting point of each said portion coincides with one of said salient peaks, and the lowest or terminal point of each said portion is located on an adjacent ascending flank of said actual profile voltage curves, said circuit means including
      (1) at least one capacitor adapted to be periodically charged across a charging circuit with a current caused by said actual profile voltages, and
      (2) at least one discharging resistance coupled parallel with said capacitor, said capacitor adapted to be periodically discharged across a discharging circuit to obtain said arcuately declining voltage values across said discharge resistance,
   (C) storing means adapted to receive said voltage values obtained from said circuit means during a forward motion of said tracer system along a predetermined path on said surface, and
   (D) a comparator circuit adapted to simultaneously receive voltage values from said storing means and voltage values obtained from said circuit means during a backward motion of said tracer system along said path, said comparator circuit adapted to transmit to its output terminals at each instant only the larger one of said simultaneously received voltage values, the series of said larger voltage values appearing at the output of said comparator circuit corresponding to said contour profile curve.

5. An apparatus as defined in claim 4, wherein said circuit means includes a charging resistance in series with said capacitor, a further resistance in series with a further capacitor, said serially connected further resistance and further capacitor are coupled parallel with said serially connected charging resistance and said capacitor, a transistor, the emitter-collector branch of which is connected parallel with said further capacitor, and the base of which is connected to the junction between said capacitor and said charging resistance, said further resistance is provided with a center tap adapted to be connected to said storing means during said forward motion of said tracer system and to said comparator circuit during said backward motion of said tracer system.

6. An apparatus as defined in claim 4, wherein said storing means includes a recording and retrieving head, a magnetic tape associated therewith and means driving said tape in a forward direction during said forward motion of said tracer system and in a backward direction during said backward motion of said tracer system.

7. An apparatus as defined in claim 4, wherein said comparator circuit includes a first diode to receive voltage values from said storing means and a second diode to simultaneously receive voltage values from said circuit means, at each instant only that one of said first and second diodes is conductive which at said instant receives the larger one of the simultaneously applied voltage values.

8. An apparatus as defined in claim 4, including a differential amplifier adapted to simultaneously receive voltage values corresponding to said actual profile voltages and voltage values supplied by said comparator circuit, and an integrator connected to the output of said differential amplifier.

9. Apparatus as defined in claim 4, wherein said discharging circuit includes a circuit element of variable resistance adapted to be controlled so that the discharge current increases proportionate to time.

10. Apparatus as defined in claim 9, wherein said circuit element is a transistor, the emitter-collector branch of which is in said discharging circuit in series with said capacitor and the base of said transistor is connected to a control voltage source.

11. Apparatus as defined in claim 10, including
(A) an additional capacitor forming part of a control voltage source,
(B) a first additional resistance through which said additional capacitor is connected to the base of said transistor,
(C) a second additional resistance,
(D) a DC voltage source for charging said additional capacitor through said second additional resistance,
(E) a third additional resistance forming part of said charging circuit, and
(F) a further transistor having
    (1) an emitter-collector branch which is connected parallel with said additional capacitor and through which the latter is discharged, and
    (2) a base connected to said third additional resistance.

References Cited

UNITED STATES PATENTS

| | | | |
|---|---|---|---|
| 2,240,278 | 4/1941 | Abbott | 73—105 |
| 3,087,329 | 4/1963 | Von Grodek et al. | 73—105 |
| 3,283,568 | 11/1966 | Reason | 73—105 |

RICHARD C. QUEISSER, Primary Examiner

J. P. BEAUCHAMP, Assistant Examiner